(12) United States Patent
Bosterling et al.

(10) Patent No.: US 8,919,661 B2
(45) Date of Patent: Dec. 30, 2014

(54) SYSTEM FOR FASTENING A RAIL AND METHOD FOR RENOVATING A RAIL FASTENING POINT

(75) Inventors: Winfried Bosterling, Neuenrade (DE); Jörg Happe, Meschede (DE)

(73) Assignee: Vossloh-Werke GmbH, Werdohl (DE)

( * ) Notice: Subject to any disclaimer, the term of this patent is extended or adjusted under 35 U.S.C. 154(b) by 0 days.

(21) Appl. No.: 13/817,269

(22) PCT Filed: Aug. 24, 2010

(86) PCT No.: PCT/EP2010/062335
§ 371 (c)(1),
(2), (4) Date: Apr. 5, 2013

(87) PCT Pub. No.: WO2012/025146
PCT Pub. Date: Mar. 1, 2012

(65) Prior Publication Data
US 2013/0206854 A1 Aug. 15, 2013

(51) Int. Cl.
*E01B 3/00* (2006.01)
*E01B 9/02* (2006.01)
*E01B 9/46* (2006.01)
*E01B 29/32* (2006.01)
*E01B 9/30* (2006.01)
*E01B 31/20* (2006.01)
*B23P 6/00* (2006.01)

(52) U.S. Cl.
CPC ... *E01B 9/02* (2013.01); *E01B 9/46* (2013.01); *E01B 29/32* (2013.01); *E01B 9/303* (2013.01); *E01B 31/20* (2013.01); *B23P 6/00* (2013.01)
USPC .............................. 238/287; 238/349; 238/351

(58) Field of Classification Search
CPC ............... E01B 9/02; E01B 9/00; E01B 9/46; E01B 9/32; E01B 9/303; E01B 9/38; E01B 9/44; E01B 9/66; E01B 9/68; E01B 9/483; E01B 29/32; E01B 31/20
USPC ......... 238/283, 287, 264, 265, 349, 350, 351, 238/377
See application file for complete search history.

(56) References Cited

U.S. PATENT DOCUMENTS 4,231,908 A * 11/1980 Pennino .......................... 524/71
6,257,495 B1 7/2001 Eisenberg
(Continued)

FOREIGN PATENT DOCUMENTS

CN 1122152 A 5/1996
CN 1216078 A 5/1999
(Continued)

OTHER PUBLICATIONS

Vossloh Fastening Systems GMBH, "System W 14 with tension clamp Skl 14", published Aug. 2010, http://www.vossloh-fastening-systems.com/de/produkte_2010/betonschwellen/w_14/w_14.html.
(Continued)

*Primary Examiner* — Jason C Smith
(74) *Attorney, Agent, or Firm* — The Webb Law Firm

(57) ABSTRACT

A system for fastening a rail to a solid foundation, and a method for renovating a rail-fastening point. The system and the method allow a fastening point for a rail to be easily and economically renovated in such a way that a permanently reliable function of the renovated fastening is then ensured again while the worn support section remains. The system for fastening a rail to a solid ground foundation includes: a layer formed by a compensating mass applied to the support section; a base plate resting on the layer and extending over the support section, upon which the rail is supported in the finally installed state; a spring element for exerting a resilient elastic retention force on the rail; and a clamping element that can be anchored in the solid foundation for clamping the spring element.

13 Claims, 7 Drawing Sheets

(56) References Cited

U.S. PATENT DOCUMENTS

| | | | |
|---|---|---|---|
| 6,471,139 B1* | 10/2002 | Bruder et al. | 238/283 |
| 7,156,319 B2* | 1/2007 | Kowalski | 238/265 |
| 7,637,438 B2* | 12/2009 | Schwiede et al. | 238/349 |
| 8,668,152 B2* | 3/2014 | Bosterling et al. | 238/315 |
| 2002/0070283 A1* | 6/2002 | Young | 238/264 |
| 2007/0070283 A1* | 3/2007 | Maki et al. | 349/146 |
| 2008/0093472 A1* | 4/2008 | Hohne et al. | 238/351 |
| 2008/0105758 A1* | 5/2008 | Schwiede et al. | 238/349 |
| 2010/0127093 A1* | 5/2010 | Vives Clavel | 238/377 |
| 2011/0272485 A1* | 11/2011 | Renneckendorf et al. | 238/264 |
| 2013/0015256 A1* | 1/2013 | Bednarczyk et al. | 238/315 |
| 2013/0056545 A1* | 3/2013 | Danneberg et al. | 238/315 |
| 2013/0105590 A1* | 5/2013 | Buda | 238/351 |
| 2013/0168460 A1* | 7/2013 | Bosterling et al. | 238/287 |
| 2013/0206854 A1* | 8/2013 | Bosterling et al. | 238/287 |
| 2013/0240635 A1* | 9/2013 | Bosterling et al. | 238/349 |
| 2013/0284819 A1* | 10/2013 | Ortmann et al. | 238/264 |
| 2013/0284820 A1* | 10/2013 | Hunold et al. | 238/287 |
| 2014/0046002 A1* | 2/2014 | Tavares et al. | 525/418 |

FOREIGN PATENT DOCUMENTS

| | | |
|---|---|---|
| CN | 201077937 Y | 6/2008 |
| DE | 19929283 A1 | 12/2000 |
| GB | 1204197 | 9/1970 |
| JP | 2002242103 A | 8/2002 |

OTHER PUBLICATIONS

Lu Zuwen, The maintenance and repair of concrete sleepers line (1), Railway Construction, 1983, 26-29, Issue No. 1.

* cited by examiner

SYSTEM FOR FASTENING A RAIL AND METHOD FOR RENOVATING A RAIL FASTENING POINT

BACKGROUND OF THE INVENTION

1. Field of the Invention

The invention relates to a system for fastening a rail to a solid foundation, on which a support section is arranged, which supports the rail to be fastened in the finally installed state.

The invention also relates to a method for renovating a rail-fastening point, at which the rail by means of a spring element tensioned by a clamping element and acting on its rail foot, is supported in an elastic manner on a support section of a sleeper in a solid material at risk from abrasion.

2. Description of Related Art

A large number of rail fastening systems of the abovementioned type which can be renovated with a method according to the invention are known. A typical example of such a fastening system which is widely used in practice and has been tried and tested is described in more detail in the installation instructions for the "Schienenbefestigungssystem W14" (W14 rail fastening system), which can be downloaded from http://vossloh-rail-systems.de.

The W14 rail fastening system is based on a concrete sleeper, in which a level, and, seen in plan view, rectangular support section for the foot of respective rail to be fastened is formed. As an alternative to a sleeper, concrete plates are also used for supporting the rails on the respective foundation and which have a corresponding design. The following explanations apply in this respect equally to all such plates or sleepers.

Seen in the longitudinal direction of the rail to be fastened, the respective support section extends across the entire sleeper, while its width measured transverse to the longitudinal extension of the rail is greater than the width of the rail foot, but smaller than the total width of the sleeper. On its narrow sides oriented parallel to the longitudinal extension of the rail the support section is delimited by in each case a depression likewise extending parallel to the longitudinal extension of the rail to be fastened over the sleeper, and having a substantially V-shaped cross section. In addition, in each of the areas of the support section present either side of the section occupied by the rail foot in the installed state a seat is formed for a dowel or similar, into which a tensioning screw can be screwed.

For fastening the rail on each of the areas of the support section not occupied by the rail foot a so-called "angled guide plate" is positioned. These angled guide plates, which for weight reasons and for the purposes of improving the elastic behaviour and the electrical resistance, are normally made from a high-strength plastic material, have a central section, on the lower face of which a support surface is formed, with which the angled guide plates sit on the support section. With the angled guide plate used for the W14 system, on the central section a support section is also formed, which starting from the support surface on the lower face of the angled guide plate extends downwards and the shape of which is matched to the shape of the depressions of the sleeper delimiting the support section. In the installed state each of the angled guide plates accordingly has a form-fit between its support section and the respectively associated depression. With their contact surface opposite the support section the angled guide plates on the other hand rest laterally on the foot of the rail to be fastened. Lateral forces which are transferred from the rail to the angled guide plates can thus be absorbed by the angled guide plates and introduced into the sleeper. Here the angled guide plates are supported by the lateral surface of the respective depression turned away from the rail.

In order to secure the rail from lifting in the known rail fastening systems normally spring elements are used, which in the installed state exert a resilient elastic retention force on the rail foot. The spring elements used in the W14 rail fastening system and similar systems, and also known as "tensioning clamps" have a W-shaped design and with their mid-section are braced against the angled guide plate. To this end in the angled guide plate a through opening is formed, via which the tensioning screw used to tension the respective tensioning clamp can be screwed into the respective dowel embedded in the sleeper.

Upon completion of installation the tensioning clamp which in this state is braced against the sleeper rests with its supporting arms extending from the mid-section on the foot of the rail to be fastened. Thus the supporting arms transmit spring forces to the rail foot, which on the one hand are strong enough to prevent excessive lifting of the rail, but on the other are elastic enough for the rail to be able to move sufficiently up and down in the vertical direction when passed over by a rail vehicle. In this way the rail is held secure but can nevertheless compensate for its deformations caused by the weight and movement of the rail vehicle.

In order to ensure the required flexibility of a rail fastening point designed in the abovementioned way, normally between the rail foot and the support section an intermediate layer in elastically flexible material is arranged.

Practical experience shows that under unfavourable installation or operational conditions considerable abrasive wear of the respective sleeper or plate occurs in the area of its support section. The wear manifests itself as irregular material removal. This can become so extreme that between the rail foot and the support section a air gap is permanently present, as a result of which secure support for the rail in the respective fastening point is no longer guaranteed and any inclination provided for the rail is permanently altered in an inadmissible manner.

It is known that an air gap which may be present between a sleeper and a ballast bed or a concrete plate, on which the sleeper stands, because of unavoidable structural inaccuracies, can be closed up by the injection of a filler (DE 19929283 A1, JP 2002/242103 A). Applying this known method to the renovation of rail fastening points at which between the support section of the sleeper and the rail foot as a result of abrasive wear an air gap has formed, proves to be problematical, however, since the forces of pressure applied to the respective fastening point when it is being passed over are so high that the filler that has been injected is not resistant for a sufficiently long period of use. It also proves difficult to apply the injection mass in such a way that any elastic intermediate layer present can continue to perform its function.

Against this background the problem for the invention was to provide a system and a method allowing a fastening point for a rail to be easily and economically renovated in such a way that a permanently reliable functioning of the renovated fastening is then ensured again while the worn support section remains.

SUMMARY OF THE INVENTION

The invention takes the method already known per se of filling an air gap present in the area of a sleeper with a filler or compensating mass, and further proposes the use of a base plate, which is designed and arranged in accordance with the invention in such a way that it evenly distributes the forces applied to the compensating mass during continuous operation. The result is that the danger of occurrence of localised concentrations of pressure and an associated failure of the compensating mass are thus avoided. It is also advantageous here that with the help of the base plate it is possible for the track of which the rail fastening point to be renovated is part, to be put back in service before the compensating mass has completely cured.

The base plate proposed by the invention for this purpose has at least two longitudinal edge sections, which are arranged at a distance from each other and which are folded in the direction of the lower face of the base plate associated with the support section or in the direction of the upper face of the base plate associated with the rail foot, and of which one longitudinal edge section is associated with one of the longitudinal sides of the sleeper so that one of the longitudinal edge sections extends along a longitudinal side of the sleeper when the base plate is finally installed on the sleeper.

As a result of the folded longitudinal edge sections a base plate according to the invention is on the one hand stiffened in such a way that even with a low thickness of the material from which it is made it has sufficient flexural strength in order in the installed state to absorb the forces applied to it substantially free from deformation.

On the other hand the folded longitudinal edges of the base plate form a guide, which makes installation of the base plate easier. Thus they make it easier in the installed state with orientation in the direction of the sleeper to the precisely-positioned orientation of the base plate in relation to the respective support section filled with compensating mass. In the case of orientation turned away from the support section and a correspondingly low height of the longitudinal edge section or sufficient thickness of the elastic intermediate layer, in a similar way, they are able to support the precisely-positioned orientation of the intermediate layer.

A system according to the invention for fastening a rail to a solid foundation comprises
 a) a layer formed by a compensating mass applied to the support section;
 b) a support plate resting on the layer formed by the compensating mass and extending over the support section, upon which the rail to be fastened is supported in the finally installed state;
 c) a spring element for exerting an elastic retention force on the rail to be fastened; and
 d) a clamping element that can be anchored in the solid foundation for clamping the spring element.

The use of a base plate designed according to the invention in a system according to the invention proves especially advantageous here.

The dimensional stability of a base plate in a system according to the invention can be further improved in that it has at least one transversal edge section which extends between the longitudinal edge sections and like the longitudinal edge sections is folded in the direction of the lower face or the upper face of the base plate. This configuration of the invention proves to be particularly advantageous if the support section, upon which the base plate is to be positioned, on its sides oriented in the longitudinal direction of the rail to be fastened is delimited in each case by a depression and the distance between transversal edge sections is the same as the distance between the depressions, so that the transversal edge sections can point into the depressions in the finally installed state of the base plate.

The shape of the base plate according to the invention is conveniently matched to the shape of the support section to be renovated. In practice the base plate will accordingly normally have a rectangular shape when seen in plan view.

If the fastening of the spring element used to retain the rail is by means of a dowel screwed into the sleeper, then a base plate according to the invention is expediently provided with at least one correspondingly arranged through opening for passing through a tensioning element, which typically will be a fastening screw.

Basically the base plate according to the invention can be made from all materials which have sufficient resilience and at the same time sufficient resistance to abrasive wear. These requirements can be met in a particularly cost-effective manner if the base plate is made from a steel material. Thus a base plate according to the invention can for example in a particularly simple manner take the form of a steel sheet which in a manner known per se is produced from a conventional structural steel.

The method according to the invention for renovating a rail-fastening point, at which the rail by means of a spring element clamped by a clamping element and acting on its rail foot, is supported in an elastic manner on a support section of a sleeper in a solid material at risk from abrasion, comprises the following work steps corresponding to the above explanations:
 a) loosening the clamping element such that the spring element releases and the rail can be lifted from the support section;
 b) lifting the rail, so that the support section of the sleeper is freely accessible;
 c) applying a layer of pasty, curable compensating mass to the support section;
 d) positioning a base plate on the layer formed by the compensating mass with the displacement at least sections in and the associated levelling out of the compensating mass;
 e) curing the compensating mass;
 f) positioning and orientating the rail on the base plate;
 g) clamping the spring element by means of the clamping element.

With this approach it is possible to lastingly remove the effects of the rail foot working into the support section of a concrete sleeper or plate due to abrasive wear, without an exchange of the respective sleeper or plate being necessary for this. After renovation this means that the rail no longer sits directly on the support section or the compensating mass applied thereon, but on a base plate which on the one hand offers an optimum level support surface for supporting the rail foot and on the other distributes the forces occurring in practical operation evenly over the compensating mass present between it and the support section.

The compensating mass provided according to the invention between the base plate and the support section in the case of a system according to the invention and which in the course of the method according to the invention is applied to the support section compensates for the unevenness in the area of the worn support section and supports the base plate resting on it such that even under the varying compressive loads occurring in practical operation it maintains its shape.

By means of the method according to the invention it is thus possible in a simple and cost-effective manner, when wear damage to the support section of a sleeper or plate is noticed, to enable safe rail operations again very quickly without the respective sleeper or plate having to be replaced.

This success is in particular ensured with particular certainty if the base plate positioned on the compensating mass in the course of the method according to the invention has a design according to the invention. Thanks to the inherent strength guaranteed by a base plate designed according to the invention, such a plate is particularly well-suited to evenly distributing the forces occurring in practical operation over the compensating mass. Accordingly, the requirements which have to be met when using a base plate designed according to the invention in terms of preciseness of distribution of the compensating mass, and thus the associated effort involved in performing the method according to the invention are further minimised.

Where the sleeper of the fastening point to be renovated has an opening to accommodate a dowel, prior to application of the compensating mass a plug must be inserted into the opening, in order to prevent the ingress of compensating mass into the opening. Following curing of the compensating mass the plug is removed, so that the clamping element necessary for clamping the respective spring element can be screwed into the dowel without problems. Where the base plate provided in accordance with the invention has a through opening associated with the opening of the sleeper, the plug may also be used for precisely-positioned orientation of the base plate, in that the length of the plug is dimensioned such that the plug when the base plate has been positioned, by means of the associated through opening, engages with the base plate.

The permanently precisely-positioned installation of the base plate arranged according to the invention on the compensating mass can also be ensured in that the compensating mass is an adhesive. Thus for example two-component compensating masses, two-component adhesives, epoxy compensating masses or cement-based compensating masses, such as injection mortar can be used for the purposes according to the invention.

If fastening points are to be renovated in accordance with the invention which comprise at least one guide plate, supporting the rail laterally against a shoulder formed in the sleeper, then in order to compensate the change in the nominal track gauge that may be caused by the use according to the invention of a base plate, the base plate concerned can be removed when the spring element is released and replaced by a guide plate, the length of which measured in the installed state transverse to the rail, differs from the length of the angled guide plate originally provided there.

If for a defined flexibility of the fastening point renovated in accordance with the invention an elastic intermediate layer is provided, then a particularly simple to install and at the same time effective arrangement of this intermediate layer results if it is supported by the base plate and in the finally installed system the rail with its rail foot is supported by the intermediate layer.

If the system according to the invention comprises at least one guide plate, supporting the rail laterally against a shoulder formed in the solid foundation, then lifting the base plate from the compensating mass or a tensile loading of the compensating mass coming from the support section can be prevented in a simple manner in that the base plate has a supporting surface on its upper face, which at least in part supports the guide plate in the finally installed state.

In the following the invention is explained in more detail with the help of exemplary embodiments. These provide schematic representations as follows:

DETAILED DESCRIPTION OF THE INVENTION

Figure 1:
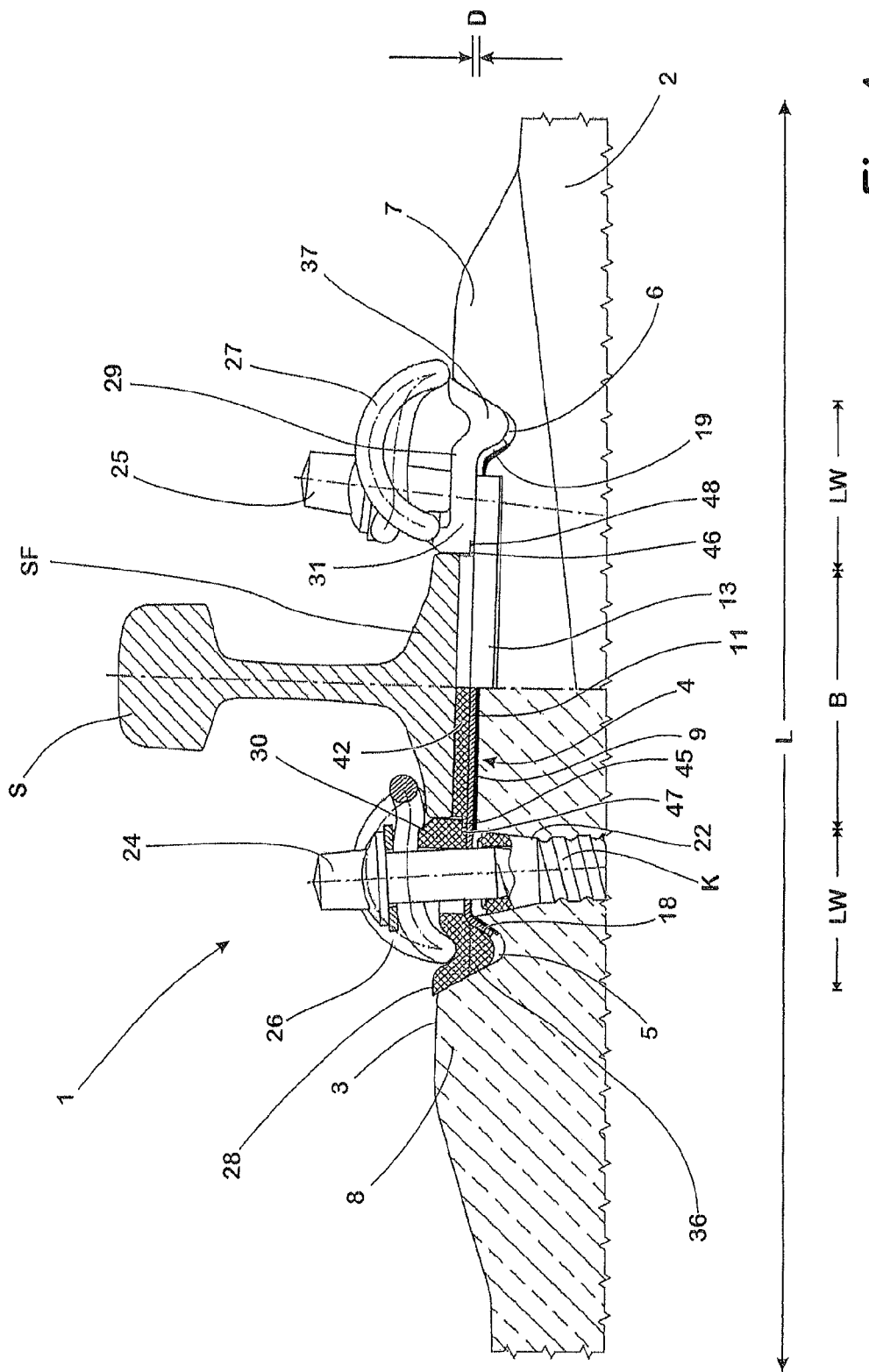
FIG. 1 is a completely renovated fastening point for a rail in a partially cut-away side view, wherein on the left cut-away side the finally installed position of the components is shown, while on the right side the pre-installed position can be seen.
Figure 2:
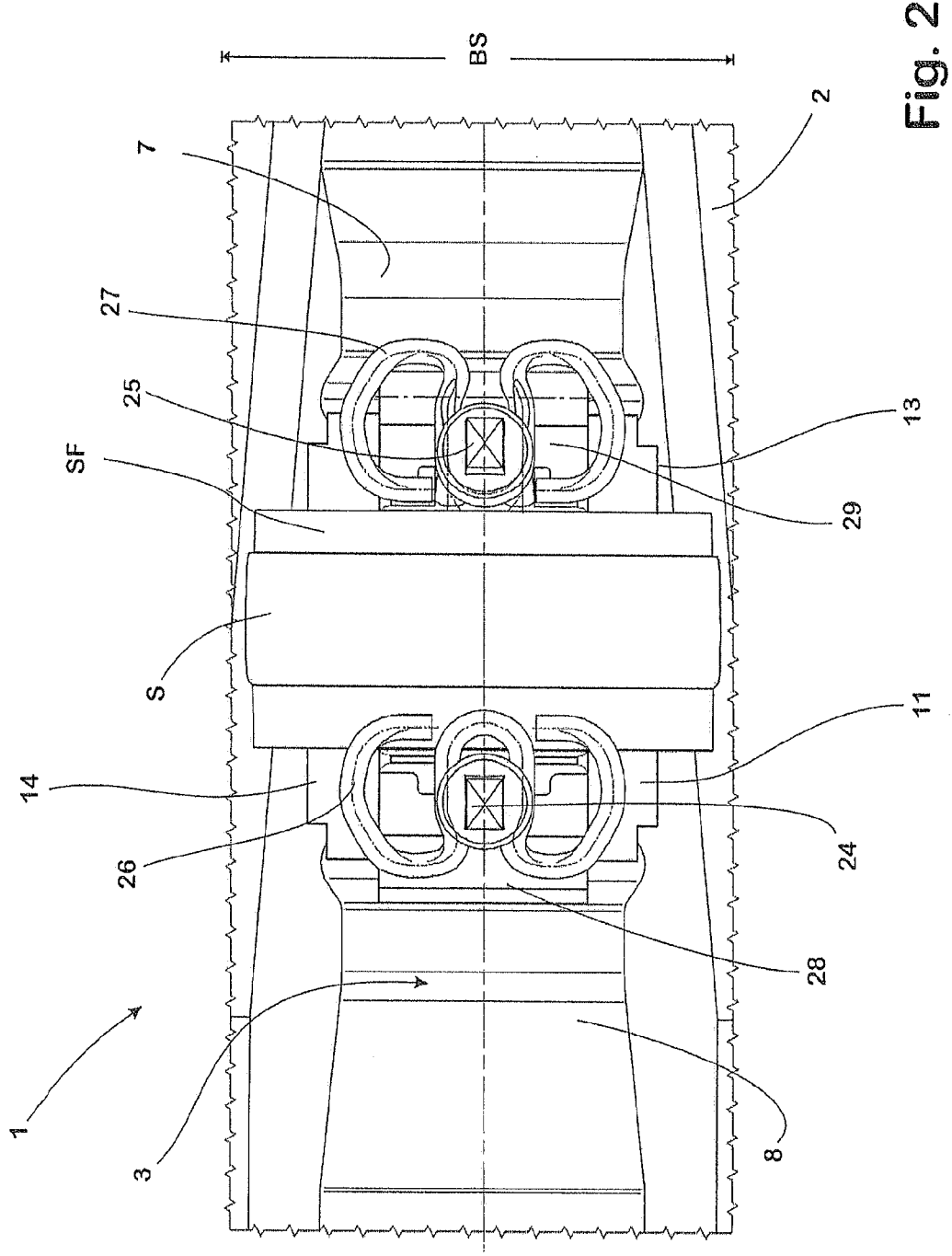
FIG. 2 is a plan view of the renovated fastening point shown in FIG. 1.
Figure 3:
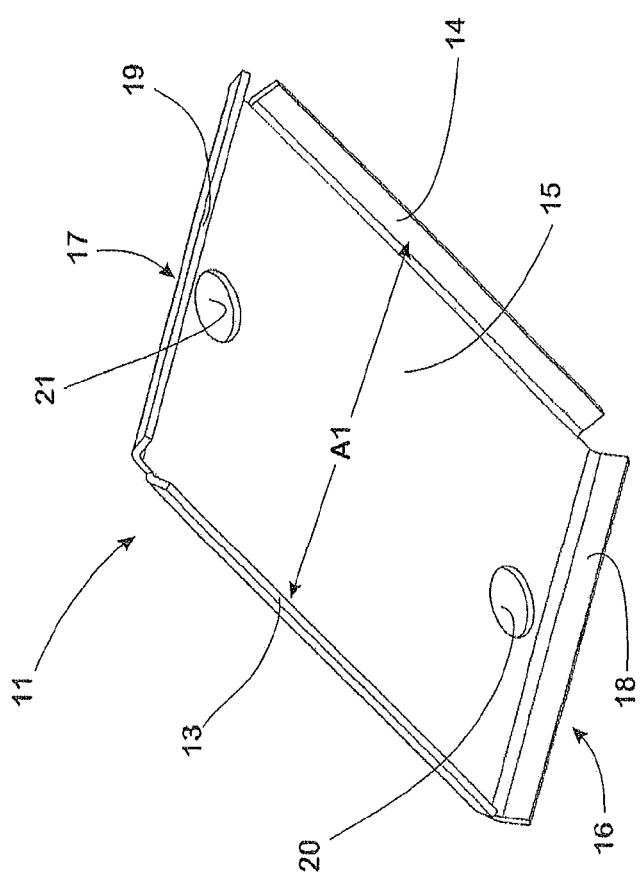
FIG. 3 is a base plate used in the renovated fastening point in perspective view from below.
Figure 4:
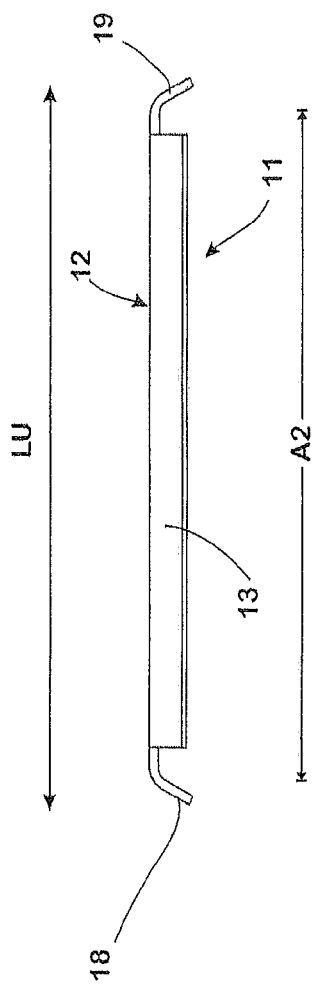
FIG. 4 is a side view of the base plate.
Figure 5:
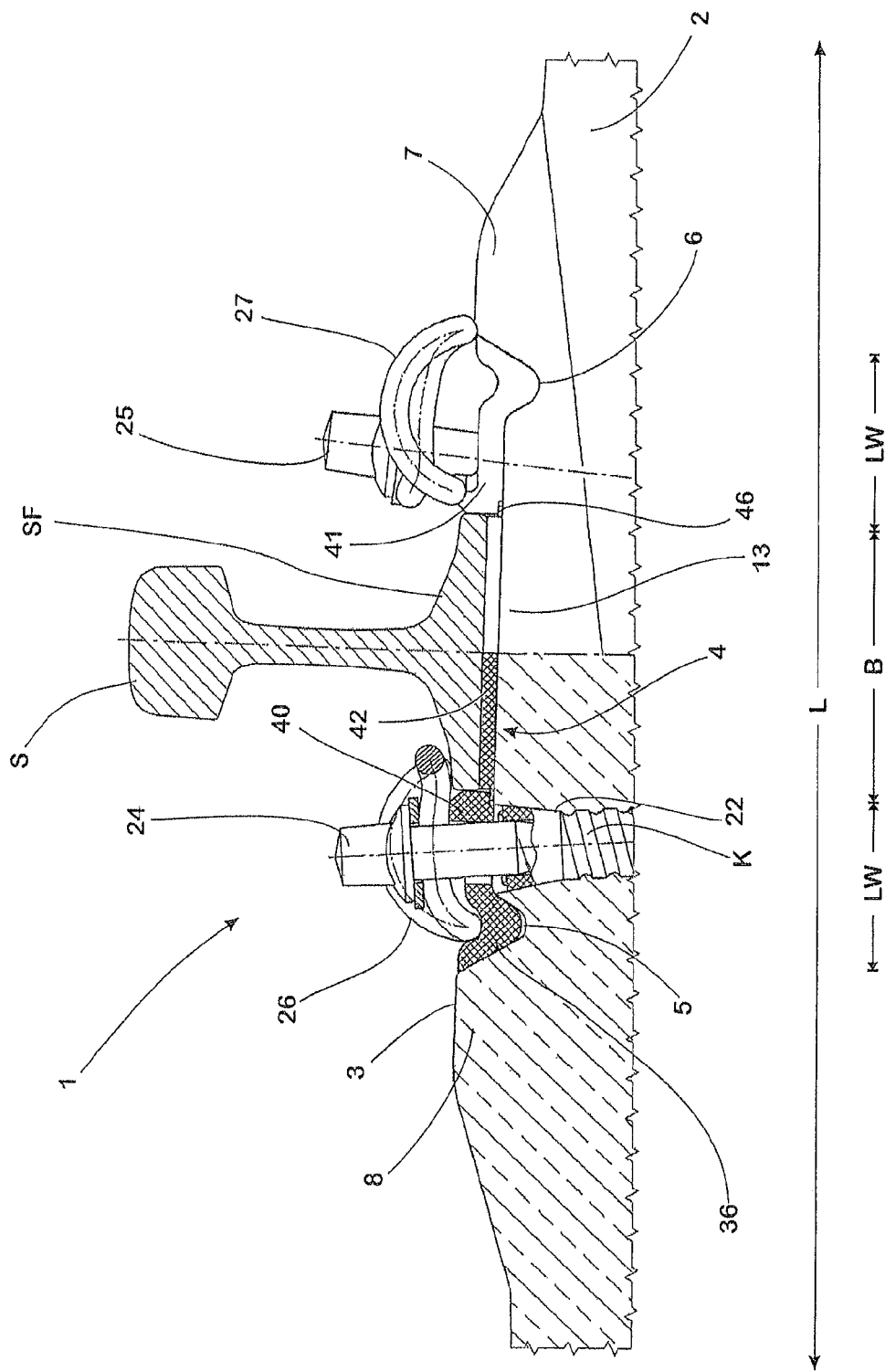
FIG. 5 is the fastening point prior to renovation in a view corresponding to FIG. 1.

FIGS. 1 and 2 show the state of a rail fastening point 1 designed according to the known W14 rail fastening system following its renovation, while FIG. 5 portrays the state prior to renovation.

The fastening point 1 shown in FIGS. 1, 2 and 5 comprises a sleeper 2 made from concrete, on the upper face 3 of which a support section 4 is formed. The support section 4 which was formerly flat but which now as a result of abrasive wear and thus associated material removal from its surface has become uneven is oriented centrally in relation to the length LS of the sleeper 2 measured transverse to the longitudinal direction L of the rail S to be fastened and has a length that is greater than the width B of the rail foot SF measured in the direction of the length LS. At the same time the support section 4 which is rectangular seen from above extends across the entire width BS of the sleeper 2 measured in the longitudinal direction L of the rail S. On each of its narrow sides the support section 4 is delimited in each case by a groove-shaped depression 5, 6, with a V-section in the cross section, which similarly extends across the width BS of the sleeper 2 and on its side turned away from the support section 4 in each case merges into a shoulder 7, 8 formed on the sleeper 42.

With the renovated fastening point 1 shown in FIGS. 1 and 2 the support section 4 has been filled with a layer 9 of curable compensating mass which fills in the uneven points 10 present on the surface of the support section 4 and covers the entire support section 4 with a certain thickness D. The compensating mass is an adhesive that cures automatically in the air and which provides a firmly bonded joint both with the concrete material of the sleeper 2 and with the steel material, of which a base plate 11 positioned at the renovated fastening point 1 on the compensating mass layer 9 consists. At the same time, the compensating mass forming the layer 9 in the cured state is dimensionally stable and solid such that when the fastening point is passed over via the base plate 11 it can safely absorb the loads evenly distributed across the layer 9.

By means of the layer 9 consisting of compensating mass, in the renovated state of the fastening point 1, on the one hand the base plate 11 is thus evenly supported such that on its upper face a level, optimally oriented contact area 12 is formed for the rail to be fastened, which serves as a replacement for the previously existing even surface on the now worn support section 4. On the other hand the base plate 11 ensures that the forces acting on the layer 9 are evenly distributed such that a localised overloading of the layer 9 is prevented and accordingly the risk of a rupture of the compensating mass forming the layer 9 is minimised. The base plate 11 present in the renovated fastening point 1, but absent from the un-renovated state of the fastening point along with the layer 9 formed from the compensating mass, is formed from a level cut-out of sheet metal, having a rectangular shape to match that of the support section 4. On each of its longitudinal edges the base plate 11 has a longitudinal edge section 13, 14 extending in the longitudinal direction LU of the base plate 11, which is folded in the direction of the lower face 15 of the base plate 11 such that in each case it is oriented approximately at right angles to the contact area 12 of the base plate 11.

On each of its narrow sides 16, 17 the base plate 11 also has a transversal edge section 18, 19, which is similarly folded towards the lower face 15 of the base plate 11. However, the enclosed angle between the transversal edge sections 18, 19 and the area of the base plate 11 that has not been deformed is matched to the angle at which the sides of the depressions 5, 6 adjacent to the support section 4 in relation to the exposed upper face 3 of the support section 4 are oriented.

The corner areas between the longitudinal edge sections 13, 14 and the transversal edge sections 18, 19 are in each case excluded in order to be able to form the longitudinal edge 13, 14 and transversal edge 18, 19 sections without folds and in a simple manner.

By means of the folded longitudinal edge 13, 14 and transversal edge 18, 19 sections the base plate 11 is strengthened in its longitudinal and transversal direction in such a way that it can transfer the forces impinging in the installed position when the fastening point 1 is passed over in a substantially deformation-free manner despite the minimal thickness of its steel sheet material. The spacing A1 of the longitudinal edge sections 13, 14 is matched to the width BS of the sleeper 2 in such a way that the longitudinal edge sections 13, 14 in their installed position, in which they are oriented transverse to the rail S, are arranged with a small distance from the associated side of the sleeper 2. On the other hand, the spacing A2 of the transversal edge sections 18, 19 is dimensioned such that the transversal edge sections 18, 19 in the installed position in each case engage in the depressions 5, 6 of the sleeper 2. In this way the base plate 11 in its installed position both in the longitudinal and in the width direction of the sleeper 2 is positioned with a form-fit.

In its end area associated with the respective transversal edge section 18, 19 the base plate 11 has a through opening 20, 21 formed in it. Here the through openings 20, 21 are arranged in such a way that in the installed position they are oriented in alignment with a respective opening 22, 23 formed in the sleeper 2 in the form of a countersunk hole, in which in each case a plastic dowel K sits. The layer 9 consisting of compensating mass is omitted in the areas of the openings 22, 23, so that a clamping screw that serves in each case as the clamping element 24, 25 for a spring element 26, 27 can be freely inserted through the through opening 20, 21 associated with it and can be screwed into the dowel K seated in the respective opening 22, 23.

With the renovated fastening point 1 at each of the lateral end areas of the base plate 11 there is a guide plate 28, 29 designed in a manner known per se as an angled guide plate with its guide section 30, 31, in which at the position arranged for locating the respectively allocated through opening 20, 21 of the base plate 11 a through opening 32, 33 is similarly formed. On its front associated with the rail S each guide section 30, 31 has a contact surface 34, 35, on which in the finally installed state of the fastening point 1 the rail foot SF is laterally guided.

A supporting section 36, 37 connects with the guide section 30, 31 of the respective guide plate 28, 29, and in a known manner has a V-shaped cross section such that in the installed position on the one hand it sits with a form-fit in the respective depression 5, 6 of the sleeper 2 associated with it and on the other with its side turned away from the contact surface 34, 35 of the respective guide plate 28, 29 it is supported on the associated shoulder 7,8 of the sleeper 2. The length LW of the guide plates 28, 29 effective for the purposes of supporting the rail foot SF, measured between the surface of the supporting section 36, 37 abutting the respective shoulder 7,8 and the contact surface 34, 35 of the respective guide plate 28, 29, must be dimensioned in such a way that the gauge of the track that is not shown in more detail here, of which the rail S is part, still meets the specification despite the positioning of the guide plates 28, 29 determined in each case by the transversal edge section 18, 19 of the base plate 11 engaging in the respective depression 5, 6.

In the fastening point 1 shown in FIG. 5, which has not yet been renovated, for lateral guidance of the rail S guide plates 40, 41 are also provided. The form of the guide plates 40, 41 corresponds to that of the guide plates 28, 29, but in the finally installed state they do not rest with their guide section directly on the upper face 3 of the support section 4 and sit with their supporting section in similarly direct contact with its side faces in the depressions 5,6 of the sleeper 2. Accordingly the effective length LW of the guide plates 40, 41 used on the fastening point 1 that has not been renovated differs by the amount by which the position of the supporting section 36, 37 of the guide plates used 28, 29 on the renovated fastening point 1, has been displaced by the transversal edge sections 18, 19 of the base plate 11 engaging with the depressions 5,6 compared with the position of the supporting section of the guide plates 28, 29 originally used on the non-renovated fastening point 1.

The spring elements 26, 27 provided for applying the necessary retaining forces are designed as conventional W-shaped tensioning clamps, as are normally used in fastening systems of the kind involved here. The spring elements 26, 27 accordingly have a U-shaped central section, upon which in the finally installed state of the fastening point 1 the respectively associated clamping element 24, 25 acts with its screw head. The shanks of the central sections of each spring element 26, 27 merge into one supporting arm. In the installed position the respective spring element 26, 27 presses in an elastic manner with its end sections oriented in opposition to one another on the upper face of the rail foot SF associated with it in each case.

Between the base plate 11 and the rail foot SF at the renovated fastening point 1 an elastic intermediate layer 42 is arranged, which in a manner known per se guarantees the required elastic flexibility of the fastening point 1. In the non-renovated state the elastic intermediate layer 42 rests directly on the upper face 3 of the support section 4. In the event that the originally present intermediate layer has worn, it is replaced during renovation by a new intermediate layer 42.

The intermediate layer 42 resting on the support plate 11 in the renovated fastening point 1 has on each of its narrow sides associated with the respective guide plate 40, 41 a projection 45, 46, which rests on the base plate 11 and the height of which is less than the thickness of the intermediate layer. In the final installed state shown in FIGS. 1 and 2, the projections 45, 46 each engage in a recess 47, 48 arranged in the front of the guide plate 40,41 associated with them, which in the exemplary embodiment shown here is designed as the recess exposed to the base plate 11 extending across the width of the guide plates 40, 41. In this way the intermediate layer 42 in the finished renovated fastening point 1 at least in the vertical direction is secured with a form-fit in such a way that it always retains its optimum position including when subject to the deformations that occur in practical operation.

In order to renovate the worn fastening point 1 the clamping elements 24, 25 are released and the spring elements 26, 27 and the guide plates 40, 41 are removed, so that the rail S can be raised and the elastic intermediate layer can be removed.

Figure 6:
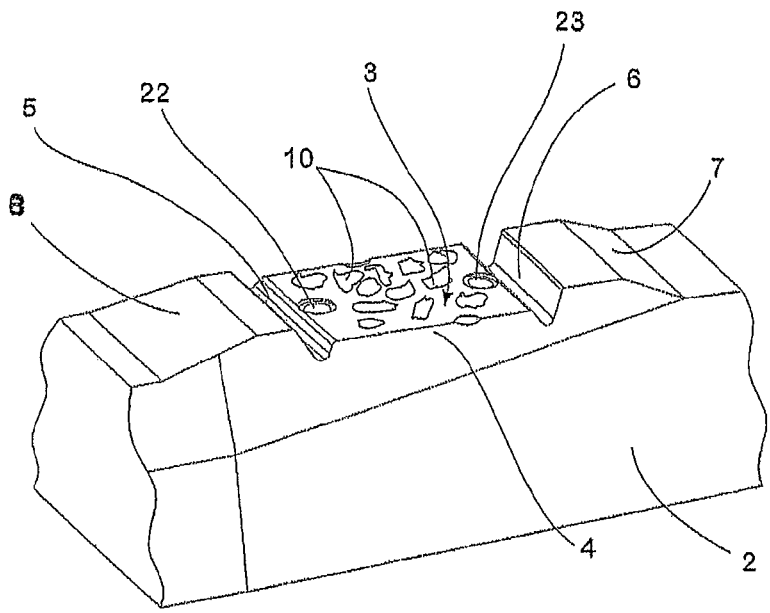
FIGS. 6-10 are the fastening point in the various stages of its renovation.

The now exposed support section 4 (FIG. 6) is cleared of soiling in particular on its upper face 3. Depending on the type of compensating mass used in addition basic drying of the support section 4 is carried out.

Figure 7:
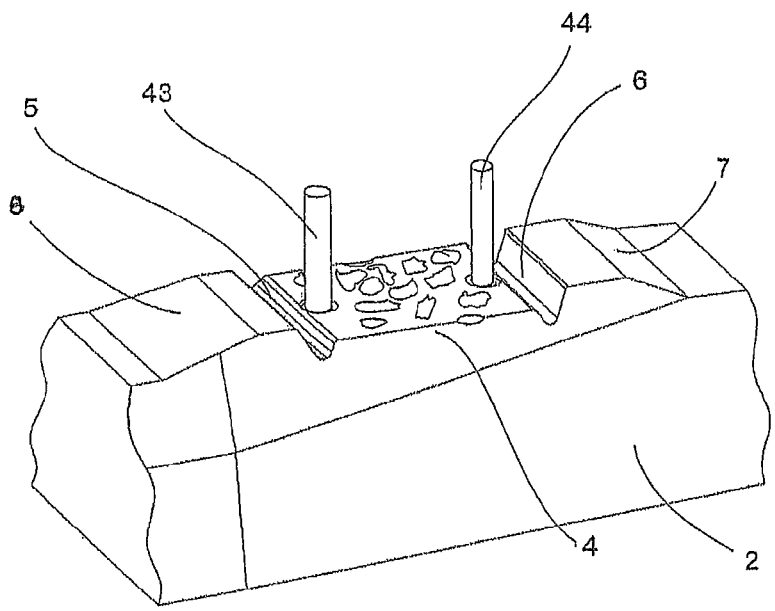

Then in the openings 22, 23 plugs 43, 44 designed according to the type of guide mandrels are inserted, which tightly seal the entrances of the openings 22, 23 and the dowels K seated therein (FIG. 7). Here the dimensions of the plugs 43, 44 correspond approximately to the dimensions of the shafts of the screws of the clamping element 24, 25.

Figure 8:
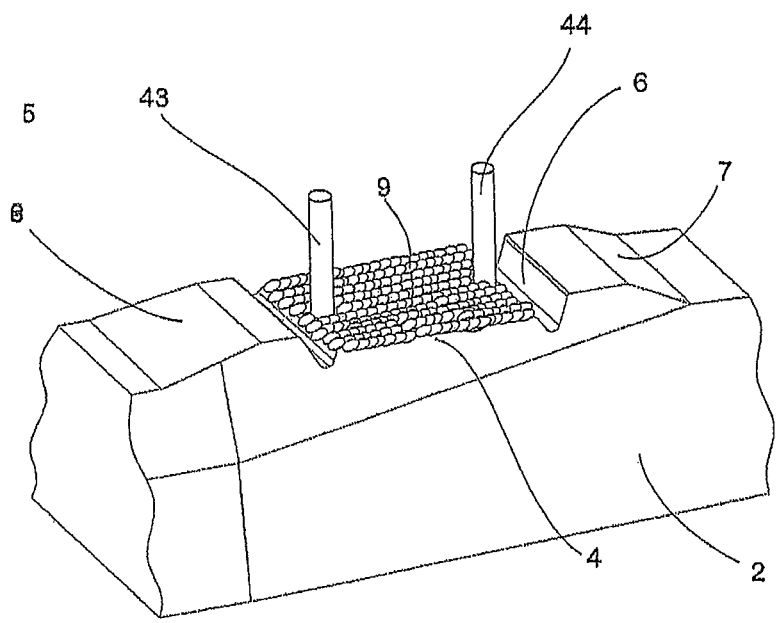
Figure 9:
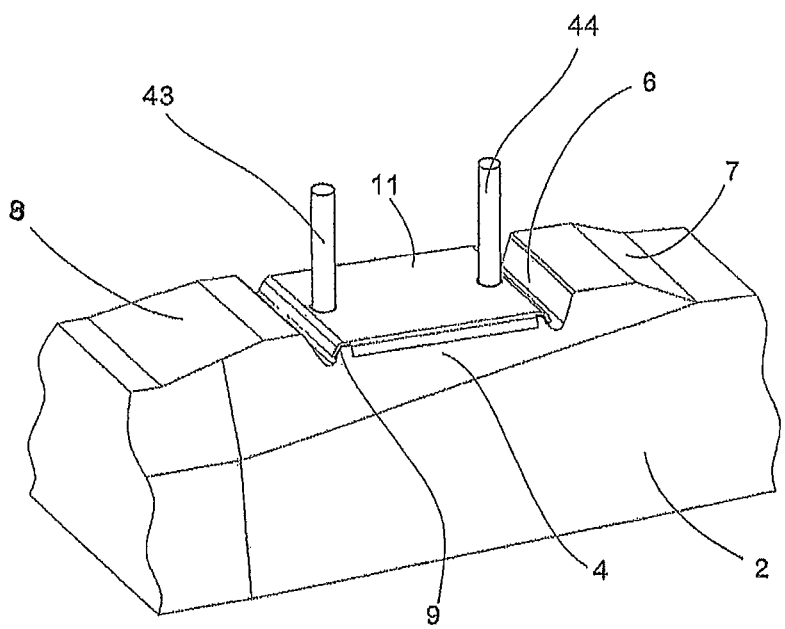
Figure 10:
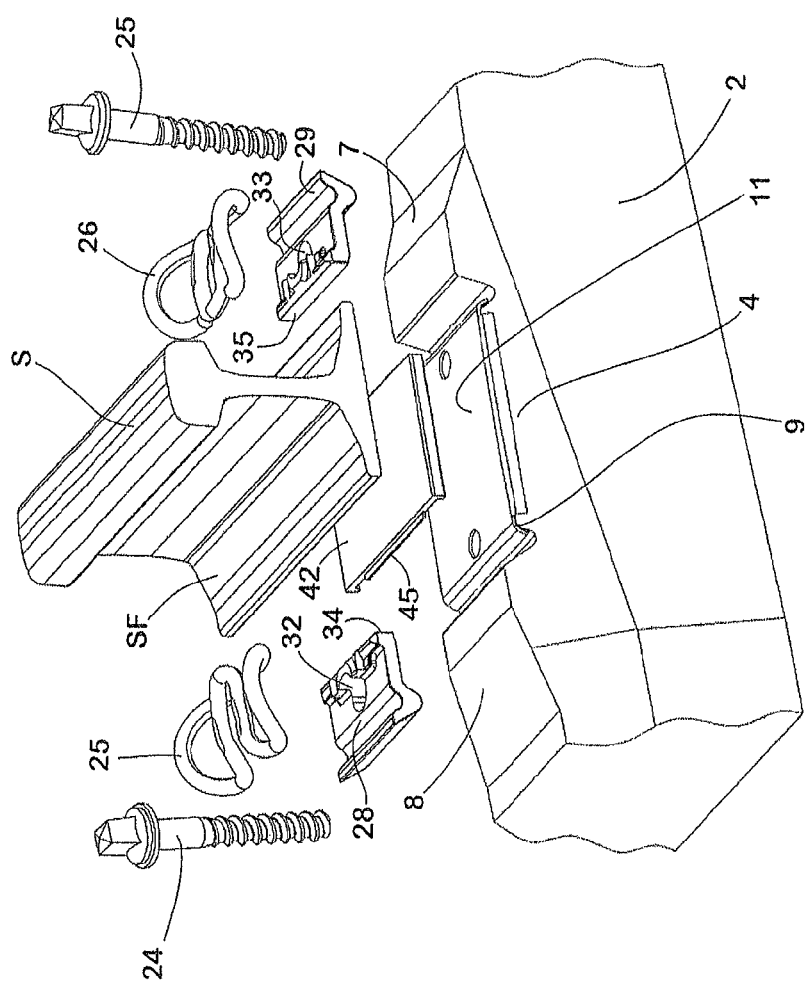

Finally a sufficient quantity of a compensating mass consisting of a two-component adhesive is spread over the cleaned and dried upper face 3 of the support section 4. Here the plugs 43, 44 prevent the compensating mass from entering the openings 22, 23 (FIG. 8).

Now the base plate 11 is placed on the layer 9 formed by the compensating mass 9. Here the base plate 11 is positioned in such a way that each of plugs 43, 44 engages in one of its through openings 20, 21 thereby forming a positioning aid for the precise orientation of the base plate 11.

Following curing of the compensating mass forming the layer 9 the plugs 43, 44 are removed, the elastic intermediate layer 42 is arranged in the planned position on the base plate 11 and in place of the originally present guide plates 40, 41, the adapted guide plates 28, 29 are arranged.

Finally the spring elements 26, 27 with the help of the clamping elements 24, 25 are pre-installed on the guide plates 28, 29 in the manner shown in the right-hand side of FIG. 1 and the rail S placed on the elastic intermediate layer 42 between the guide plates 28, 29. Then the spring elements 26, 27 are pushed from the pre-installed position into their finally installed position shown on the left-hand side of FIG. 1, in which they act with the spring arms on the rail foot SF of the rail S, and are clamped by means of the clamping elements 24, 25, which are screwed into the dowels K associated with them seated in the openings 22, 23 in the sleeper 2 which have now become freely accessible again.

The invention claimed is:

1. A system for fastening a rail to a solid foundation, on which a support section is formed, on which the rail to be fastened is supported in a finally installed state, comprising:
    a) a layer formed by a compensating mass applied to the support section;
    b) a base plate resting on the layer and extending over the support section, upon which the rail to be fastened is supported in the finally installed state;
    c) a spring element for exerting a resilient elastic retention force on the rail to be fastened; and
    d) a clamping element that can be anchored in the solid foundation for clamping the spring element,
    wherein the base plate is designed to be laid on a support section on which the rail is supported in the finally installed state, wherein the base plate has at least two longitudinal edge sections, which are arranged at a distance from each other and which are folded in the direction of a lower face of the base plate associated with the support section, and of which one longitudinal edge section is associated with one longitudinal side of a sleeper so that one of the longitudinal edge sections extends along a longitudinal side of the sleeper when the base plate is finally installed on the sleeper.

2. The system according to claim 1, wherein the base plate has at least one transversal edge section, extending between longitudinal edge sections, and which is folded in the direction of a lower face associated with the support section or an upper face of the base plate associated with a rail foot.

3. The system according to claim 1, wherein the support section, on which the base plate is to be laid, is delimited on each of its sides oriented in the longitudinal direction of the rail to be fastened by a depression and in that the transversal edge section is arranged such that in the finally installed state of the base plate it engages with one of the depressions.

4. The system according to claim 1, further comprising at least one guide plate, which supports the rail laterally against a shoulder formed in the solid foundation.

5. The system according to claim 1, wherein the base plate has a contact surface on its upper face, upon which the guide plate rests at least in part in the finally installed state.

6. The system according to claim 1, wherein in the solid foundation at least one opening is formed, in which a dowel sits, into which a clamping element in the finally mounted state is screwed.

7. The system according to claim 1, wherein the base plate has a through opening for inserting the clamping element into the opening.

8. The system according to claim 1, wherein the compensating mass is an adhesive.

9. The system according to claim 1, further comprising an elastic intermediate layer which is provided to be positioned between a rail foot of the rail to be fastened and the base plate.

10. A method for renovating a rail-fastening point, at which the rail by means of a spring element tensioned by a clamping element and acting on its rail foot, is supported in an elastic manner on a support section of a sleeper in a solid material at risk from abrasion, comprising the following work steps:
    a) loosening the clamping element such that the spring element releases and the rail can be lifted from the support section;
    b) lifting the rail, so that the support section of the sleeper is freely accessible;
    c) applying a layer of pasty, curable compensating mass to the support section;
    d) positioning a base plate on the layer of compensating mass with a displacement at least in sections and the associated levelling out of the compensating mass;
    e) curing the compensating mass;
    f) positioning and orientating the rail on the base plate; and
    g) tensioning the spring element by means of the clamping element.

11. The method according to claim 10, wherein the sleeper has an opening to accommodate a dowel and in that prior to application of the compensating mass, a plug is inserted into the opening, in order to prevent the ingress of compensating mass.

12. The method according to claim 10, wherein the base plate has a through opening associated with the opening of the sleeper, and the plug has a length that is dimensioned such that the plug, when the base plate has been positioned, engages the base plate by means of the associated through opening.

13. The method according to claim 10, wherein the fastening point to be renovated comprises at least one guide plate, which supports the rail laterally against a shoulder formed on the sleeper, and in that the guide plate, when the spring element has been released, is removed and replaced by a guide plate, the length of which in the installed position measured transversally to the rail differs from the length of the guide plate originally provided there.

* * * * *